I. H. CHAPPELL.
Corn-Planter.
No 63,019.　　　　　　　　　　　　　　　　Patented Mar. 19, 1867.
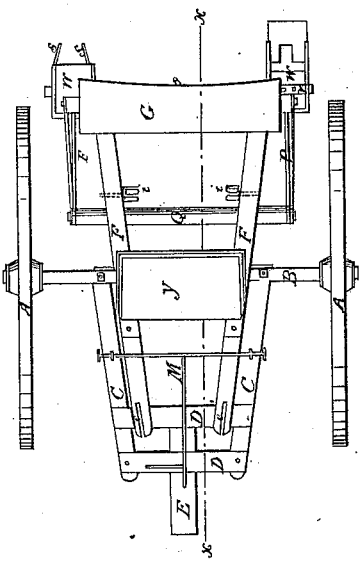
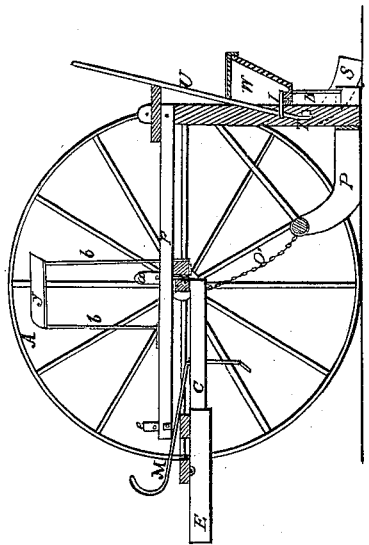
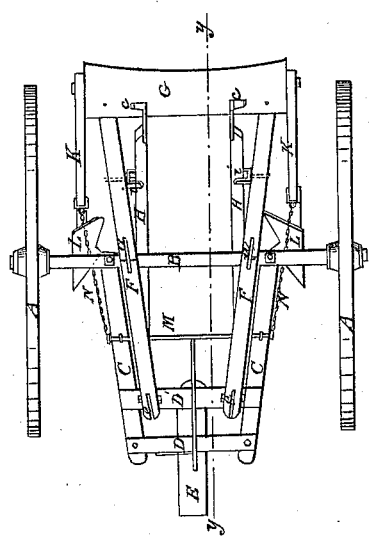
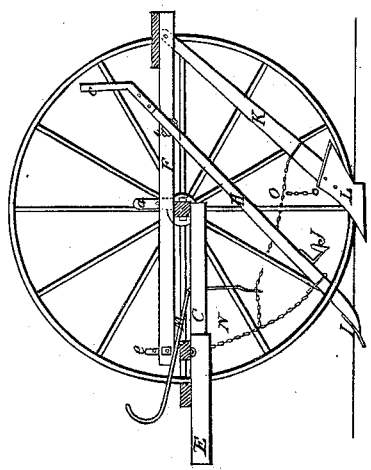
Witnesses:　　　　　　　　　　　　　　　　Inventor:

United States Patent Office.

ISAAC H. CHAPPELL, OF LAWRENCE, KANSAS.

Letters Patent No. 63,019, dated March 19, 1867.

IMPROVEMENT IN COMBINED PLANTER AND CULTIVATOR.

*The Schedule referred to in these Letters Patent and making part of the same.*

TO ALL WHOM IT MAY CONCERN:

Be it known that I, ISAAC H. CHAPPELL, of Lawrence, in the county of Douglas, and State of Kansas, have invented a new and improved Combined Cultivator and Corn Planter; and I do hereby declare that the following is a full, clear, and exact description thereof, reference being had to the accompanying drawings forming part of this specification.

The nature of my invention consists in so constructing and combining a cultivator with a corn planter that the ground may be cultivated and at the same time corn may be planted in the most perfect manner.

These machines are so constructed that the planter may be detached and only the cultivator used, thereby avoiding the expense of two separate machines.

To enable others skilled in the art to make and use my invention, I will proceed to describe its construction and operation.

Figure 1 is a top plan view of my machine with the planter detached.

Figure 2 is a top plan view of the same with the planter attached.

Figure 3 is a longitudinal vertical sectional elevation of the cultivator from the line $y\ y$.

Figure 4 is also a longitudinal vertical sectional elevation with planter attached, from the line $x\ x$.

Letters of like name and kind refer to like parts in each of the figures.

In my improved machine A A may represent two wheels of common construction, and of any desired dimensions, that run on the axle B, that may be made of either wood or iron, and of any convenient length.

Upon the under side of the said axle B are rigidly secured two converging bars or hounds, C C, that extend to a suitable distance forward where the front ends are secured together by two cross-bars, D D', to which the pole or tongue E is secured, and by which the machine is drawn and operated.

Upon the top of the said axle B are two upright bars, $a\ a$, that extend up from the said axle.

F F are also two converging bars or hounds that extend to almost equal distances to the rear and front of the axle B, and in which are provided mortises that pass over the bars $a\ a$. At the front ends of the said bars F F are slots that fit over two upright bars, $e\ e$, that are secured to and extend up from the cross-piece D'. The said uprights $e\ e$ are provided with holes so that the front ends of the bars F F may be elevated or lowered as may be desired.

At the rear end of the said bars F F is a cross-piece, G, that firmly holds the ends of the said bars in their proper position.

H H are two standards, upon the lower ends of which are secured the ploughs I I. These standards are secured to the beams by means of double joints, $i\ i$, so that the ploughs can have both a vertical and lateral motion. These joints are made with a shank passing through the bars F F, and at the outside of the bars are straps which receive the standards, in which the said standards are secured by means of a bolt, so that the shank is allowed to work freely in the bars or hounds F F, and the standards in the straps, so that both a vertical and lateral motion may be imparted to the ploughs.

J J are stirrups secured to the standards at a suitable point for the benefit of the driver to assist in operating the ploughs.

K K are also standards pivoted by a bolt to the rear end of the bars F F, upon the lower ends of which are secured the plows I I.

M is a crank-lever or rock-shaft located upon and across the bars or hounds C C. To the arms of this rock-shaft or crank-lever are attached jack chains N N, that connect with the standards H H.

To the chains N N are connected other short chains O O, that also connect with standards K K. The crank-lever and chains serve the purpose of elevating and lowering the ploughs.

At the tops of the standards H H are arms, $c\ c$, provided for the purpose of assisting the feet in working or operating the ploughs and giving them a lateral motion so as to conform to all the sinuosities of the rows. These arms can be used without interfering with the driver's attention to his team, and by pressing down on them the ploughs can be easily raised so as to throw off anything that has accumulated in front of the ploughs.

At the rear side of the axle B are hooks that are provided for the purpose of attaching by means of chains, O' O', a corn planter constructed in the following manner:

P P are two runners, the front ends of which are secured by a roller or cross-piece, Q. At the rear ends of the runners are uprights, R R, to which are attached scrapers, S S, that cover the seed. The rear ends of the said runners are secured by means of a cross-bar, T. To this cross-bar T is a pivoted lever, U, that connects and operates the sliding-bar V, that extends through the bottoms of the hoppers W W.

These hoppers are located upon and secured to the cross-bar T.

When it is desired to use the cultivator alone, the chains O O are detached from the hooks on the rear side of the axle B, when the cultivator can be used among any kind of crops planted in rows.

When it is desired to use the planter, it is attached to the cultivator by the chains before described, and all the plough standards removed, and by working the lever U alternately back and forth the seed is allowed to pass through the perforation of the slide V in the bottom of the seed-hoppers W W.

Y is the driver's seat that is secured to standards or uprights $b\ b\ b\ b$, which are secured to the bars F F.

Having thus described my invention, what I claim as new, and desire to secure by Letters Patent, is—

1. In so arranging the crank-lever M that when the ploughs are raised they will be thrown apart, so that, in turning, the ploughs will not break down the corn.

2. The standards $e$, in combination with the bars F F, for the purpose of elevating and lowering the ploughs without changing their angle.

3. Attaching the bars F F to the standards $e\ e$ for the purpose of elevating or lowering the ends of the bars F F so as to change the line of draught above or below the centre of the axle substantially as shown and described.

ISAAC H. CHAPPELL.

Witnesses:
    CHAS. CHADWICK,
    H. O. LEARNED.